United States Patent
Rowley et al.

[11] Patent Number: 5,965,077
[45] Date of Patent: Oct. 12, 1999

[54] METHOD OF MAKING AN OVERMOLDED FLEXIBLE VALVE

[75] Inventors: William W. Rowley, Chagrin Falls; Richard T. Seman, Newbury, both of Ohio

[73] Assignee: Mercury Plastics, Inc., Middlefield, Ohio

[21] Appl. No.: 08/951,222

[22] Filed: Oct. 16, 1997

[51] Int. Cl.[6] .......................... B29C 33/12; B29C 45/14; B29C 45/33; B29C 33/76
[52] U.S. Cl. .......................... 264/263; 264/275; 264/278
[58] Field of Search .......................... 264/296, DIG. 66, 264/266, 275, 263, 271.1, 278; 425/111, 121, 393

[56] References Cited

U.S. PATENT DOCUMENTS

| | | |
|---|---|---|
| 2,275,820 | 3/1942 | Hosking . |
| 3,834,257 | 9/1974 | Ganser ........................................ 82/44 |
| 3,920,787 | 11/1975 | McDowell et al. ...................... 264/263 |
| 3,940,227 | 2/1976 | Strasser .................................... 425/392 |
| 3,986,738 | 10/1976 | Van Der Velde ........................ 285/403 |
| 4,130,264 | 12/1978 | Schroer .................................... 249/180 |
| 4,138,460 | 2/1979 | Tigner ...................................... 264/159 |
| 4,229,014 | 10/1980 | Crowe ......................................... 279/2 |
| 4,238,180 | 12/1980 | Gordon et al. .......................... 425/403 |
| 4,239,473 | 12/1980 | Fulhaber ................................. 425/392 |
| 4,261,947 | 4/1981 | Ogi ........................................... 264/263 |
| 4,470,784 | 9/1984 | Piotrovsky ............................... 425/116 |
| 4,754,543 | 7/1988 | Spivy ......................................... 29/557 |
| 5,160,474 | 11/1992 | Huff .......................................... 264/255 |
| 5,182,032 | 1/1993 | Dickie et al. .............................. 249/91 |
| 5,246,065 | 9/1993 | Huff .......................................... 165/173 |
| 5,302,336 | 4/1994 | Hartel et al. ............................ 264/263 |
| 5,305,741 | 4/1994 | Moles ....................................... 128/207 |
| 5,314,135 | 5/1994 | Forrest, Jr. et al. .................... 242/72.1 |
| 5,540,582 | 7/1996 | Catalanotti et al. .................... 425/577 |
| 5,556,114 | 9/1996 | Fabris et al. ............................ 279/2.08 |
| 5,560,882 | 10/1996 | Daguet et al. .......................... 264/265 |
| 5,637,407 | 6/1997 | Hert et al. .............................. 428/474.7 |
| 5,656,693 | 8/1997 | Ellul et al. ............................... 525/171 |

*Primary Examiner*—Angela Ortiz
*Attorney, Agent, or Firm*—Oldham & Oldham Co., LPA

[57] ABSTRACT

The invention encompasses an overmolding process which includes the steps of inserting a flexible one-way valve into a plastic conduit, inserting the conduit with the valve at least partially onto a mold core, radially expanding at least a portion of the mold core from a first radial position to a second extended radial position, molding a polymer over at least a portion of the mold core and the plastic conduit, and radially contracting at least a portion of the mold core from the second extended radial position to essentially the first radial position. The radial expansion and contraction is in response to axial movement of a tapered shaft from a first axial position to a second expanded axial position, the shaft having a first diameter and a second diameter at a terminal end of the shaft, the second diameter being smaller than the first diameter. The axial shaft movement is in response to a controllable supply of a compressible gas which overcomes the biasing force of a spring to move the piston shaft.

16 Claims, 4 Drawing Sheets

5,965,077

METHOD OF MAKING AN OVERMOLDED FLEXIBLE VALVE

TECHNICAL FIELD

This invention relates to an piston-like apparatus and a process for using the apparatus to manufacture an overmolded flexible valve for which longitudinal and radial alignment orientation must be maintained during subsequent overmolding operations.

BACKGROUND OF THE INVENTION

One-way check valves are present in a variety of applications for which the flow of a liquid or a gas is intended to be essentially unidirectional. While it is easy to properly align and insert these valves into stainless steel or copper tubes, this is not the case when the valve is flexible and the tube is either a rigid or flexible plastic, and particularly when subsequent manipulative steps are performed on the workpiece. These operations may shift the initial position of the flexible valve to a skewed position, thereby permitting the backflow of liquid through the valve, and defeating the purpose of the valve. This is particularly true during overmolding operations as will be discussed below wherein the valve inside the tube is subject to a pressurized heated mold environment such as is present in overmolding applications.

It is well known to encapsulate components within a plastic molding die cavity by rigidly affixing such components to or through the walls of the cavity. It is also known to avoid the appearance of holding devices at the surface of the molded product by providing retractable holding devices which retract out of the molding cavity while the molding material is setting up. It is also possible for the holding devices to retract into the center of the molded product. Such prior art holding devices and techniques, however, do not hold the encapsulated component in a precisely defined position, and are therefore, of limited usefulness. In many applications, the encapsulated components must maintain precise positions relative to other encapsulated components or with respect to the exterior contours of the molded product.

The problem of precisely positioning encapsulated components within an injection molding cavity can be further complicated by two additional factors. If the component to be encapsulated is not rigid, the problem of holding it in a precise position is far more difficult. Furthermore, the dimensions of the molded product may be such that very little leeway exists for positioning the encapsulated component away from the surfaces of the mold.

SUMMARY OF THE INVENTION

According to this invention, there is provided a method and apparatus for overmolding an elastomeric shape onto a plastic substrate conduit while maintaining the orientation of various components which are contained within the plastic conduit. In performing the method of the invention, the components within the plastic conduit are held in place during the overmolding operation by the operation of at least two opposed collet bits or fingers, which move radially in response to axial movement of a frustoconical shaft of a piston. The shaft is maintained in the extended axial position during the overmolding process, followed by axial retraction with corresponding radial retraction subsequent to the injection molding of the overmolded component.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

Figure 1:
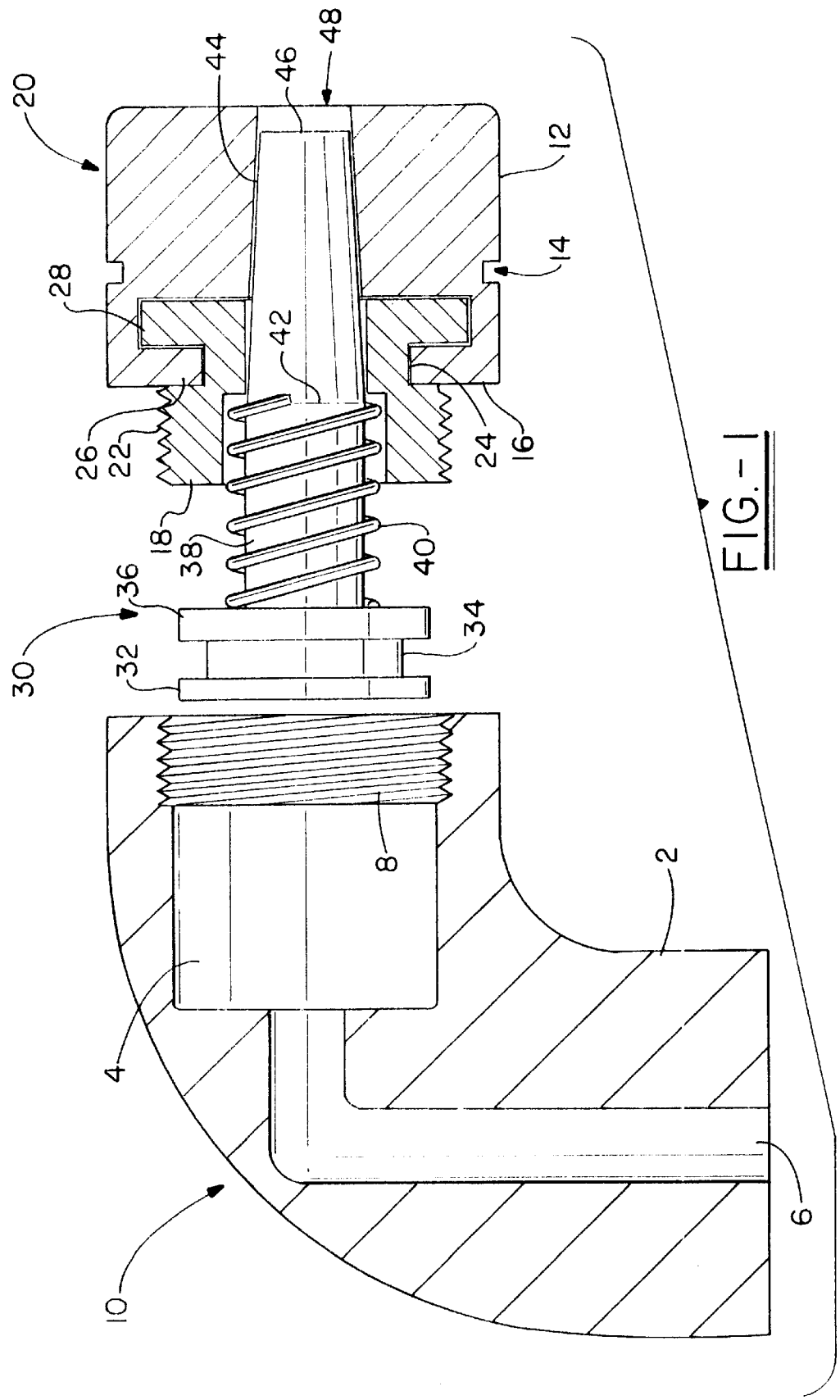
FIG. 1 is an assembly elevational view, in cross-section, showing the various elements forming the present invention.
Figure 3:
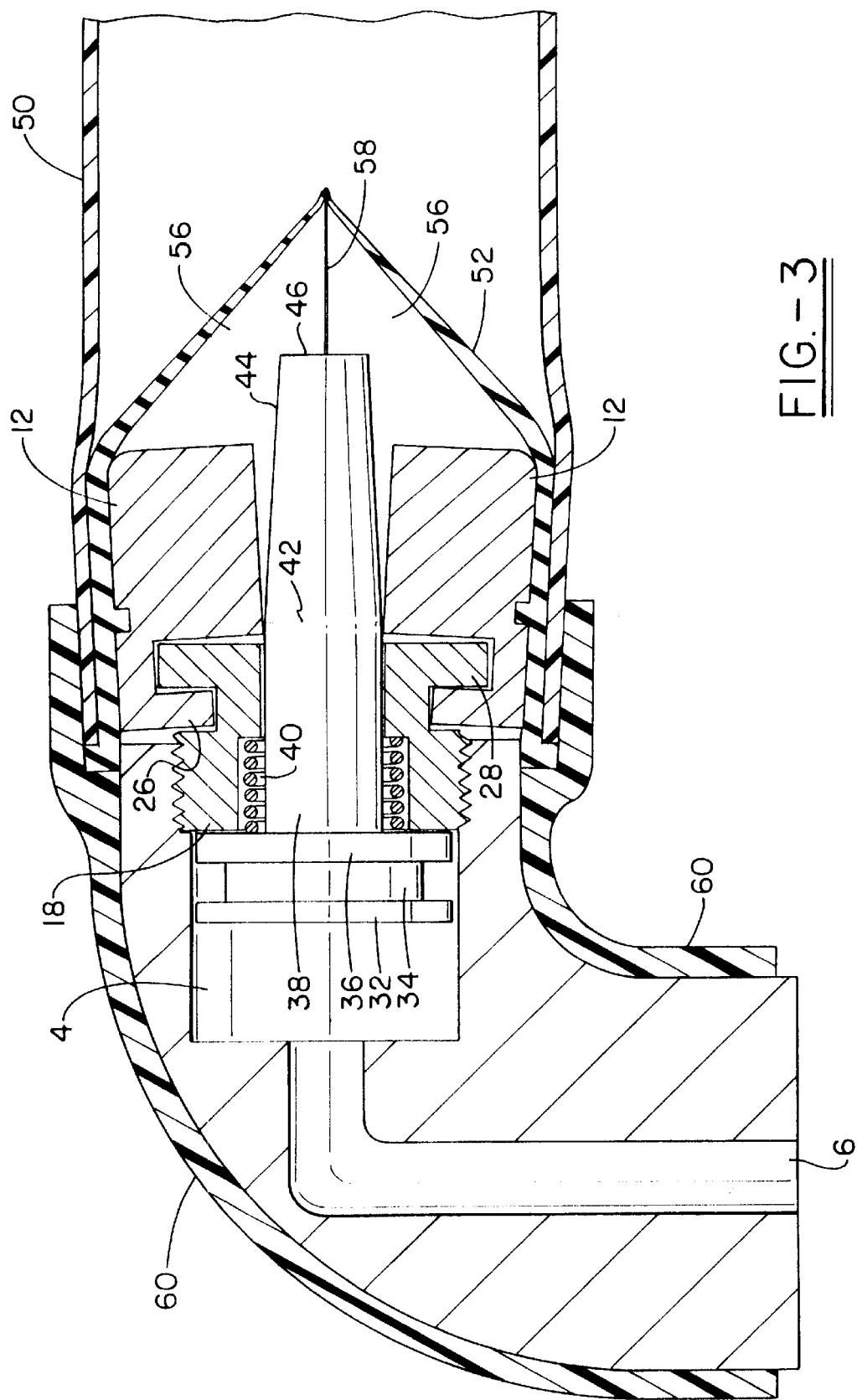
FIG. 3 is an elevational view, in cross-section, showing the operational position of the elements.

This invention will now be described in detail with referenced to preferred embodiments thereof. As illustrated in FIG. 1, the core mold is comprised of a mold core body 10, a collet assembly 20 and an axially extendable piston assembly 30. The mold core body is generally cylindrical and of dimensions suitable to be positioned inside an injection mold cavity (not shown) so as to permit molten polymer to flow about void space created between the mold core body and the mold cavity. The mold core body may optionally have curves or bends associated therewith, depending upon the ultimate shape of the overmolded component desired. As shown in FIG. 1, the terminal end of the mold core body is bent at approximately 90°, thereby resulting in an overmolded component of similar angularity after injection molding, as illustrated in FIG. 3.

Within mold core body 10 is a hollow, essentially cylindrical void 4 at a distal end of the mold core body and a communicating conduit 6 with the cylindrical void 4 for the passage of a compressed gas from a controllable source (not shown) at the proximal end to the head space void of the cylindrical void 4 at the distal end. For most applications, this compressed gas will typically be air, although there is no reason to limit the application to such, and any compressible gas is usable in this invention. The outer terminus of the cylindrical void 4 will generally be threaded 8, although this is not an essential aspect of the invention and retaining means other than threaded engagement are envisioned, e.g., bolts, welds, etc.

The cylindrical void 4 at the distal end of the mold core body is dimensioned so as to be capable of receiving a moveable piston assembly 30 therein. The moveable piston assembly comprises a piston head and longitudinally extending shaft projecting therefrom. The piston head is an essentially cylindrical body with a first flange 32, a second flange 36, a gap between the two flanges defining an annular groove 34 for positioning of an O-ring (not shown) therebetween. The flanges are dimensioned so as to permit insertion of the piston head into the cylindrical void 4 and permit axial movement therein in response to pressure variations caused by the pressurizing and depressurizing of the conduit 6 and void space in the cylindrical void above the piston head. The frustoconical longitudinally extending shaft comprises a cylindrical first portion 38 adjacent to the second flange 36, said cylindrical first portion having a first outer diameter and a tapered conical portion 44 terminating in a second outer diameter which is smaller than the first outer diameter. The shaft begins to taper from the first to the second outer diameter at tapering point 42, said point positioning being variable depending upon several factors, which include the degree of radial movement desired, degree of taper and dimensions of the collet bits or fingers as described subsequently. The shaft terminates at the terminal end 46 of the pin. In a more preferred embodiment, piston assembly 30 will further contain a biasing means 40, typically a coiled spring which will bias the moveable piston assembly to the retracted position.

Collett assembly 20 is comprised of pin retaining means 18 having a central bore disposed therethrough, said bore permitting insertion of the shaft of the piston assembly therethrough, which is threadably engageable 22 with cylindrical void threads 8 at one end and flange 28 at an opposed end, with annulus 24 defined between the retaining means 22, (e.g., threads) and flange 28. The assembly will include at least two opposed collet bits 12, each of which have a flange 26 which is insertable into the retaining means annulus 24, yet which permits pivotal movement of the collet bit flange effected by axial movement by the shaft of the piston assembly. Each collet bit 12 will be a cylinder segment, internally dimensioned so as to approximate the degree of taper of the shaft 44, said degree of taper being defined as an oblique surface to a longitudinal axis of the piston shaft and externally dimensioned so as to fit inside an internal diameter of the flexible one-way valve.

Figure 2:
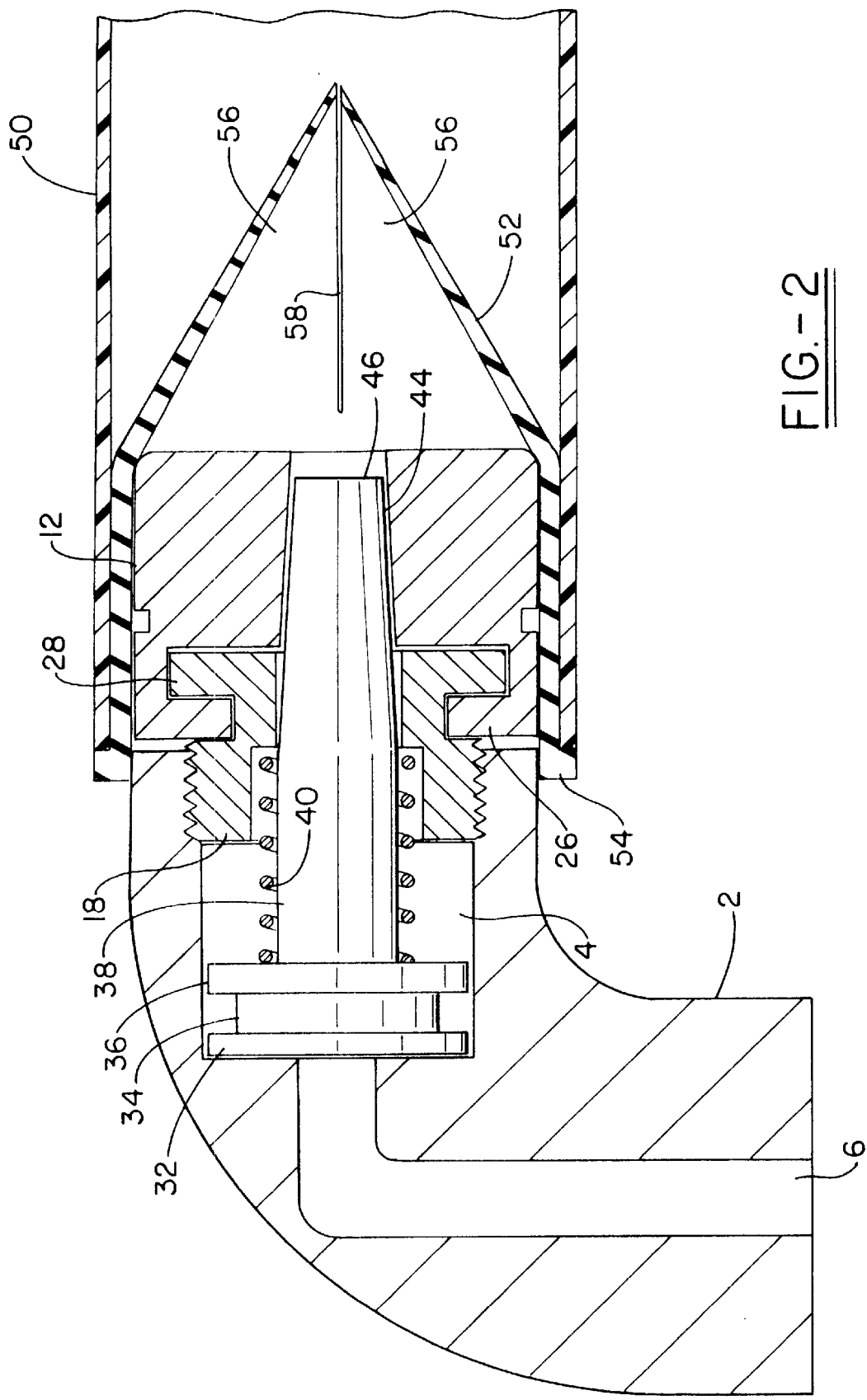
FIG. 2 is an elevational view, in cross-section, showing the elements in position for an overmolding process.

In operation, the core mold will begin with the piston assembly in an essentially fully retracted position as shown in FIG. 2, with biasing means positioning the piston head toward the top of the cylindrical void. A flexible one-way valve 52 having a collar 54 is inserted into one end of an essentially cylindrical hollow plastic conduit 50. The flexible one-way valve will have at least two, generally 4 or more, flaps 56 which are molded into an essentially closed, but generally not leakproof configuration, an equal number of gaps 58 being between the flaps. Each flap is capable of outward radial movement, from the normally closed position to the open position due to liquid flow through the valve.

Upon activation of the compressed air source, and at the point when the compressed air pressure exceeds the compressive force of the biasing means 40, the piston head moves axially down the cylindrical void 4, with the increasing degree of taper of the frustoconical shaft gradually forcing the collet bits 12 radially outward against the interior walls of the valve and the plastic conduit due to the contacting surfaces, thereby firmly positioning the respective components in place and permitting the injection overmolding process to begin.

Injection molding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. When the mold closes, the prefill valve shifts to close the opening to the reservoir. The area behind the main ram is then pressurized. After the injection cycle, the prefill valve opens to allow the clamp to gently open the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

After the completion of the overmolding process, an overmolded polymer 60 sealingly engages the one-way valve 52, and the plastic conduit 50. It is during the above-described injection overmolding process, that the combination of heat and pressure has the potential to shift the alignment of the flexible one-way valve 52 from its initial positioning prior to the overmolding process, potentially leading to a misalignment as shown in FIG. 4 wherein the valve is shown skewed inside the plastic conduit, thereby leading to an valve which will permit flow in a reverse direction, due to the misalignment of the flaps 56, and thereby defeating the purpose of the valve.

Figure 4:
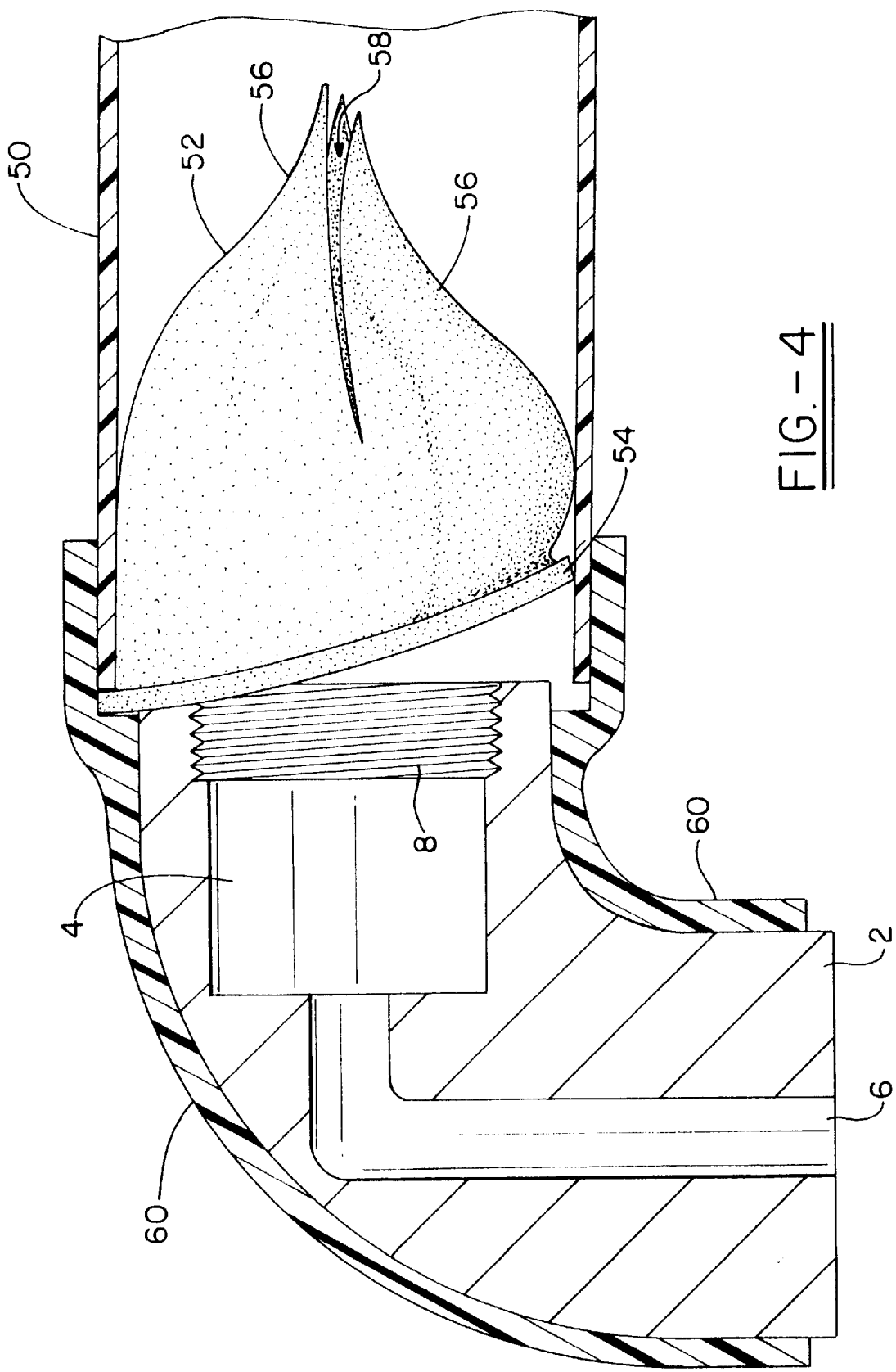
FIG. 4 is an elevational view, in cross-section, illustrating a misalignment which could occur of the valve member when the present invention is not in use.

Due to the radially exerted pressure of the collet bits, the type of mis-alignment shown in FIG. 4 is minimized. After a sufficient period of time for the overmolded polymer to cool, the pressure is released and the piston returns to its normally retracted position, due to the biasing means force. As the tapered shaft moves in conjunction with the piston head, the collet bits return to their normal position within the mold, thereby permitting removal of the finished part from the core hold by the application of a force to pull the part off the mold.

DISCUSSION

While the precise composition of the plastic conduit, overmolded polymer and flexible valve are not required to be of any specified polymer, in general, there are several guidelines which are applicable in the practice of this invention. It is of course, recognized that the precise operating conditions utilized in the overmolding process are well-known in the art and are specific to each injection molded polymer. It is well within the skill of the art to determine the applicable conditions which will result in the appropriate overmolded polymer and plastic conduit. The degree of flexibility of the plastic conduit is not of particular relevance for this invention. The plastic conduit can be a thermoplastic or a thermoset. The key is that the overmolded polymer must be capable of forming a leak-proof bond, either chemical or physical, with the plastic of the conduit.

In the practice of this invention, illustrative and non-limiting examples of the polymers which may be used in various combinations to form the plastic conduit as well as polymers which may be used in the overmolding process would include: polyacetals, typically highly crystalline linear thermoplastic polymers of oxymethylene units; poly (meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers must satisfy at least two simultaneous conditions. First, the plastic conduit must not soften and begin melt flow to the point where it looses structural integrity and second, the overmolded polymer must be capable of forming an essentially leak-proof interface with the plastic conduit, preferably through either a chemical and/or physical bond between the underlying plastic and the overmolded plastic. One of the keys is the recognition that the plastic conduit must be capable of maintaining structural integrity during the overmolding conditions during which the overmolded polymer is in melt flow.

While using polymer compositions which have differing softening points is one way to achieve the above objective, there are alternatives, which would include the use of two compositions which have the same softening point, but which are of different thicknesses, thereby through manipulation of the time, temperature and pressure conditions experienced during the molding operation, the plastic conduit would not experience melt flow, even though it had a similar softening point or range. It is also possible that through the incorporation of various additives in the polymeric compositions, e.g., glass fibers, heat stabilizers, antioxidants, plasticizers, etc., that the softening temperatures of the polymers may be controlled.

In a preferred embodiment of the invention, the composition of the overmolded polymer will be such that it will be capable of at least some melt fusion with the composition of the plastic conduit, thereby maximizing the leak-proof characteristics of the interface between the plastic conduit and overmolded plastic. There are several means by which this may be effected. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

In yet another embodiment, composites of rubber/thermoplastic blends are useful in adhering to thermoplastic materials used in the plastic conduit. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is postulated, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having a internally latent stresses which upon the application of heat, permit the relaxation of the stresses with resulting contraction of various polymeric strands within the composition during cooling.

In one specific embodiment of this invention which meets the above criteria, the plastic conduit will be polypropylene and the overmolded polymer is SANTOPRENE® thermoplastic elastomer by Advanced Elastomer Systems having a Shore A durometer of approximately 73. In this manner, due to the fact that the SANTOPRENE® polymer is an ethylene-propylene copolymer, the melt fusion of at least a portion of the polypropylene arms with at least the propylene portion of the SANTOPRENE® will be effected.

VALVE COMPOSITION

The flexible one-way valve composition will generally be of a rubber composition or a thermoplastic elastomeric composition. This is necessary due to the repeated movement of the flaps in response to typically liquid flow therethrough. In a preferred embodiment of the invention, this rubber composition will be an EPDM rubber. EPDM rubbers are well known to those skilled in such art and, generally mean ethylene/propylene terpolymer elastomers, with a minor amount of nonconjugated diene (e.g., 1 to 15 percent of the terpolymer), e.g., hexadiene, dicyclopentadiene or ethylidene norbornene. The unsaturated part of the polymer molecule is pendant from the main chain, which is essentially completely saturated. Suitable diene-based rubbers would include homopolymers of butadiene or isoprene such as cis-1,4-polybutadiene, cis-1,4-polyisoprene, natural rubber and blends thereof. The ethylene propylene diene monomer (EPDM) copolymer comprises repeat units of from about 20 to about 90 weight percent, and more desirably from about 30 to about 85 weight percent ethylene, from about 10 to about 80 weight percent, more desirably from about 15 to about 70 weight percent of at least one alpha olefin having from 3 to 16 carbon atoms (usually mostly propylene) based on the total of ethylene and alpha olefins having from 3 to 16 carbon atoms, and from about 1 to about 15%, of one or more non-conjugated dienes. Examples of non-conjugated dienes would include 1,4-hexadiene and cyclic non-conjugated dienes such as 5-ethylidene-2-norbornene (ENB), norbornadiene, methylnorbornene, dicyclopentadiene, 2-methylnorbornadiene, 4,7,8,9-tetrahydroindene, 1,5-cyclooctadiene and 5-vinyl-2-norbornene.

The valve composition can also be a butyl rubber, an essentially saturated rubber, and will comprise a copolymer of primarily polyisobutylene (~97%) and a minor amount of polyisoprene (~3%) and halogenated derivatives thereof, e.g., chlorinated butyl rubber and brominated butyl rubber. More generically, the butyl rubber is a copolymer which will comprise at least 50, desirably at least 80 and preferably at least 90 weight percent repeat units from $C_4$ to $C_7$ isomonoolefins having $C_4$ as a majority portion thereof and a conjugated diene.

The valve composition rubber can additionally be one of cis-1,4-polyisoprene rubber (natural and/or synthetic rubber), 3,4-polyisoprene rubber, styrene/butadiene copolymer rubbers, butadiene/acrylonitrile copolymer rubbers, styrene/isoprene/butadiene terpolymer rubbers, and cis-1,4-polybutadiene rubber. The rubber can comprise two or more diene-based rubbers. For example, a combination of two or more rubbers may include combination such as cis-1,4-polyisoprene (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

This invention has been described in detail with reference to specific embodiments thereof, including the respective best modes for carrying out each embodiment. It shall be understood that these illustrations are by way of example and not by way of limitation.

What is claimed is:

1. An overmolding process which comprises:

inserting a flexible one-way valve into a plastic conduit;

inserting the conduit with one-way valve at least partially onto a mold core, said mold core comprising:

a mold body having a cylindrical void disposed therein at a distal end, and further comprising a pressure means in communication with the cylindrical void;

a piston assembly which comprises a piston head dimensioned for axial movement within the first cylindrical void, a piston shaft extending axially from the head, the shaft having a first diameter and a second diameter at an end of the shaft, the second diameter being smaller than the first diameter, and the shaft having a taper defined by a difference between the diameters over at least a portion of the shaft; and piston retaining means with a bore disposed therethrough dimensioned so as to permit insertion of the shaft of the piston; and at least two collet bits adjacent to a tapered potion of the shaft, each bit comprising an inner cylindrical tapered surface segment, the inner surface being oblique to a longitudinal axis of the piston shaft, a degree of taper of the inner surface being essentially the same as the degree of taper of the piston shaft, an outer cylindrical surface segment, the outer surface dimensioned for insertion inside the flexible valve;

applying an amount of pressure from the pressure means sufficient to move the piston assembly from a first axial position to a second extended axial position, with corresponding radial movement of the at least two collet bits from a first radial position to a second expanded radial position thereby positioning the flexible valve and the plastic conduit in place;

overmolding a polymer over at least a portion of the main body and plastic conduit;

decreasing the pressure sufficient to permit radial movement of the collet bits from the second expanded radial position essentially to the first radial position to permit removal from the mold body.

2. The process of claim 1 wherein the pressure means is a controllable supply of a compressible gas.

3. The process of claim 1 wherein the mold core further comprises a collet bit retaining means.

4. The process of claim 3 wherein the piston retaining means is a threadably engageable collar having a central bore therethrough, the bore dimensioned so as to permit axial movement of the piston shaft within the bore.

5. The process of claim 4 wherein the piston retaining means further comprises a flange at an opposed side from a plurality of threads; and an annular recess disposed between the flange and the threads.

6. The process of claim 5 wherein each collet bit has a flange dimensioned for insertion into the annular recess of the piston retaining means.

7. The process of claim 1 wherein
the mold core further comprises a biasing means inserted onto the piston shaft.

8. The process of claim 7 wherein
the biasing means biases the piston shaft to the first longitudinal position.

9. The process of claim 1 wherein
the degree of taper is linear from the first diameter to the second diameter.

10. An overmolding process which comprises:

inserting a flexible one-way valve into a plastic conduit;

inserting the conduit with the valve at least partially onto a mold core;

radially expanding at least a portion of the mold core from a first radial position to a second extended radial position;

overmolding a polymer over at least a portion of the mold core and the plastic conduit; and radially contracting at least a portion of the mold core from the second extended radial position to essentially the first radial position.

11. The process of claim 10 wherein
the step of radially expanding is in response to axial movement of a tapered shaft from a first axial position to a second expanded axial position, the shaft having a first diameter and a second diameter at a terminal end of the shaft, the second diameter being smaller than the first diameter.

12. The process of claim 11 wherein
the axial movement of the tapered shaft is in response to a controllable supply of a compressible gas.

13. The process of claim 12 wherein
the axial movement of the tapered shaft is biased to the first position axial position.

14. The process of claim 11 wherein
the step of radially contracting at least a portion of the mold core is associated with at least some axial movement of the tapered shaft from the second expanded axial position toward the first axial position.

15. The process of claim 11 wherein
the step of radially expanding is effected by at least two collet bits, each bit comprising an inner cylindrical tapered surface segment, the inner surface being oblique to a longitudinal axis of the tapered shaft, a degree of taper of the inner surface being essentially the same as the degree of taper of the shaft, an outer cylindrical surface segment, the outer surface dimensioned for insertion inside the flexible valve.

16. The process of claim 15 wherein
the step of radially expanding is effected by at least four collet bits.

* * * * *